US012724543B2

(12) United States Patent
Pak et al.

(10) Patent No.: US 12,724,543 B2

(45) Date of Patent: Sep. 1, 2026

(54) APPARATUS AND METHOD FOR MANAGING MEMORY CELL ENDURANCE OF ANALOG COMPUTING SYSTEM

(71) Applicant: ELECTRONICS AND TELECOMMUNICATIONS RESEARCH INSTITUTE, Daejeon (KR)

(72) Inventors: Eun-Ji Pak, Daejeon (KR); Kwang-Won Koh, Daejeon (KR); Chang-Dae Kim, Daejeon (KR); Tae-Hoon Kim, Daejeon (KR); Yeon-Jeong Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/971,506

(22) Filed: Dec. 6, 2024

(65) Prior Publication Data

US 2025/0190119 A1 Jun. 12, 2025

(30) Foreign Application Priority Data

Dec. 8, 2023 (KR) ........................ 10-2023-0177769
Sep. 24, 2024 (KR) ........................ 10-2024-0129258

(51) Int. Cl.
*G06N 3/065* (2023.01)
*G06F 3/06* (2006.01)
(Continued)

(52) U.S. Cl.
CPC .......... *G06F 3/0616* (2013.01); *G06F 3/0659* (2013.01); *G06F 3/0673* (2013.01);
(Continued)

(58) Field of Classification Search
CPC .... G06F 3/0616; G06F 3/0659; G06F 3/0673; G06F 3/0688; G06F 12/0207;
(Continued)

(56) References Cited

U.S. PATENT DOCUMENTS 11,049,586 B2 6/2021 Parikh et al.
2012/0060060 A1 3/2012 Danilak
(Continued)

FOREIGN PATENT DOCUMENTS

KR 10-2020-0069901 A 6/2020
KR 10-2021-0071471 A 6/2021
(Continued)

*Primary Examiner* — Reginald G Bragdon
*Assistant Examiner* — Zakaria Mohammed Belkhayat
(74) *Attorney, Agent, or Firm* — Sughrue Mion, PLLC

(57) ABSTRACT

Disclosed herein are an apparatus and method for managing memory cell endurance of an analog computing system. The apparatus for managing memory cell endurance of an analog computing system includes memory configured to store at least one program and a processor configured to execute the program, wherein the program is configured to determine analog processing elements in which matrix data is to be arranged and write matrix data to the determined analog processing elements, and as an update for matrix data stored in the analog processing elements occurs, write updated matrix data to memory cells selected based on a number of write operations on internal memory cells of each of the analog processing elements.

20 Claims, 9 Drawing Sheets

(51) Int. Cl.
*G06F 12/02* (2006.01)
*G06F 17/16* (2006.01)
*G06F 12/06* (2006.01)

(52) U.S. Cl.
CPC ........... *G06N 3/065* (2023.01); *G06F 3/0688* (2013.01); *G06F 12/0207* (2013.01); *G06F 12/06* (2013.01); *G06F 17/16* (2013.01)

(58) Field of Classification Search
CPC ........... G06F 12/06; G06F 17/16; G06G 7/48; G06G 7/32; G06N 3/065
See application file for complete search history.

(56) References Cited

U.S. PATENT DOCUMENTS

2018/0113649 A1 4/2018 Shafiee Ardestani et al.
2019/0065118 A1 2/2019 Muralimanohar et al.
2020/0184315 A1 6/2020 Kim et al.
2021/0173895 A1 6/2021 Han et al.
2021/0334335 A1 10/2021 Kodavanji et al.
2021/0397967 A1 12/2021 Tsai et al.
2022/0108159 A1 4/2022 Hwang et al.
2022/0222525 A1 7/2022 Lee et al.
2023/0097363 A1 3/2023 Nam et al.
2023/0121052 A1 4/2023 Kim et al.
2023/0206033 A1 6/2023 Rhe et al.
2023/0306252 A1* 9/2023 Ambrogio ............... G06F 17/12
2023/0385562 A1 11/2023 Lee

FOREIGN PATENT DOCUMENTS

KR 10-2022-0046284 A 4/2022
KR 10-2023-0019094 A 2/2023
KR 10-2023-0043520 A 3/2023
KR 10-2023-0101300 A 7/2023
KR 10-2023-0163763 A 12/2023

* cited by examiner

APPARATUS AND METHOD FOR MANAGING MEMORY CELL ENDURANCE OF ANALOG COMPUTING SYSTEM

CROSS REFERENCE TO RELATED APPLICATIONS

This application claims the benefit of Korean Patent Application Nos. 10-2023-0177769, filed Dec. 8, 2023 and 10-2024-0129258, filed Sep. 24, 2024, which are hereby incorporated by reference in their entireties into this application.

BACKGROUND OF THE INVENTION

1. Technical Field

The following embodiments relate to technology related to analog compute-in-memory that is the principal component of an analog computing system.

2. Description of the Related Art

An analog computing system refers to a computing system configured based on analog compute-in-memory.

Also, analog compute-in-memory technology is technology that intends to utilize memory, which was merely used to store data in the past, as a computation device, and refers to a technique in which an operation (computation) is performed on a memory cell itself. For example, the analog compute-in-memory technology is chiefly configured based on next-generation nonvolatile memory such as flash memory, Resistive Random Access Memory (ReRAM), Magnetoresistive RAM (MRAM), and Phase-Change Memory (PCM), and is also referred to as analog Processing In Memory (PIM) or analog Computing In Memory (CIM).

In conventional analog compute-in-memory technologies, periodic refresh of specific memory cell values or drift-aware Artificial Intelligence (AI) retraining is performed to prevent computational errors caused by drift phenomenon of analog compute-in-memory. However, the former negatively impacts the memory cell endurance, while the latter incurs significant overhead.

SUMMARY OF THE INVENTION

An embodiment is intended to reduce errors in an analog computing system and extend memory usage lifespan by managing the endurance of memory cells of analog compute-in-memory.

An embodiment is intended to solve the problem of analog compute-in-memory endurance attributable to overhead corresponding to the number of write operations when a request for update of values stored in analog compute-in-memory cells and for a write operation occurs.

In accordance with an aspect, there is provided a method for arranging a matrix in an analog processing element, including determining a number of analog processing elements in which each of one or more matrices is to be arranged, generating sub-matrices by dividing each of the one or more matrices by the determined number of analog processing elements, and determining respective positions of the analog processing elements at which the sub-matrices resulting from division are to be arranged.

Determining the number of analog processing elements may include calculating a minimum number of analog processing elements required for arranging each of the one or more matrices, calculating utilization of a total number of analog processing elements based on calculated minimum numbers, and calculating a number of analog processing elements to be used to arrange each of the one or more matrices.

Calculating the minimum number may include dividing a size of each of the one or more matrices by a size of each analog processing element.

Calculating the number of analog processing elements may include when the utilization is 1, determining the number of analog processing elements to be used to arrange each of the one or more matrices to be the corresponding minimum number.

Calculating the number of analog processing elements may include when utilization is not 1, determining the number of analog processing elements to be used to arrange each of the one or more matrices to be a value obtained by dividing the corresponding minimum number by the utilization.

Determining respective positions may include sorting the sub-matrices in ascending order based on a size, sorting the analog processing elements in descending order of a write number counter value, and arranging the sub-matrices and the analog processing elements to be mapped to each other in order of sorting.

In accordance with another aspect, there is provided a method for performing a write operation on memory cells in consideration of endurance, including as an update of matrix data stored in an analog processing element occurs, determining a position of a next reference memory cell among internal memory cells of the analog processing element, and writing updated matrix data to memory cells selected based on the determined position of the next reference memory cell.

Determining the position of the next reference memory cell may include satisfying a condition in which a number of write operations on a memory cell corresponding to a first row and a first column of the analog processing element becomes a maximum value among numbers of write operations on all memory cells.

Determining the position of the next reference memory cell may include fixing a position of a row of the next reference memory cell and shifting a position of a column of the next reference memory cell to left by one column, when the position of the column is a second column, shifting the position of the row upwards by one row, and thereafter performing again shifting the position of the column to the left by one column.

The analog processing element may include one write number counter, and the write number counter is configured such that the number of write operations on the memory cell located in the first row and the first column is recorded.

The analog processing element may be configured such that an input voltage of a word line (WL) corresponding to a row of a memory cell to which matrix data is not written, among internal memory cells of the analog processing element, is set to 0 and such that an output of a bit line (BL) corresponding to a column of the memory cell to which matrix data is not written is discarded.

In accordance with a further aspect, there is provided an apparatus for managing memory cell endurance of an analog computing system, including an analog compute-in-memory including multiple analog processing elements, and an endurance manager configured to manage the analog compute-in-memory, wherein the endurance manager is configured to determine analog processing elements in which matrix data is to be arranged and write matrix data to the determined analog processing elements, and wherein as an update for matrix data stored in the analog processing elements occurs, write updated matrix data to memory cells selected based on a number of write operations on internal memory cells of each of the analog processing elements.

The endurance manager may be configured to, when the analog processing elements in which the matrix data is to be arranged are determined, determine a number of analog processing elements in which each of one or more matrices is to be arranged, generate sub-matrices by dividing each of the one or more matrices by the determined number of analog processing elements, and determine respective positions of the analog processing elements at which the sub-matrices resulting from division are to be arranged.

The endurance manager may be configured to, when the analog processing elements in which the matrix data is to be arranged, calculate a minimum number of analog processing elements required for arranging each of the one or more matrices, calculate utilization of a total number of analog processing elements based on calculated minimum numbers, and calculate a number of analog processing elements to be used to arrange each of the one or more matrices.

The endurance manager may be configured to, when respective positions of the analog processing elements at which the sub-matrices resulting from division are to be arranged are determined, sort the sub-matrices in ascending order based on a size, sort the analog processing elements in descending order of a write number counter value, and arrange the sub-matrices and the analog processing elements to be mapped to each other in order of sorting.

The endurance manager may be configured to, when the updated matrix data is written, determine a position of a next reference memory cell among internal memory cells of each of the analog processing elements, and write updated matrix data to memory cells selected based on the determined position of the next reference memory cell.

The endurance manager may be configured to, when the position of the next reference memory cell is determined, satisfy a condition in which a number of write operations on a memory cell corresponding to a first row and a first column of each of the analog processing elements becomes a maximum value among numbers of write operations on all memory cells.

The endurance manager may be configured to, when the position of the next reference memory cell is determined, fix a position of a row of the next reference memory cell and shift a position of a column of the next reference memory cell to left by one column, and when the position of the column is a second column, shift the position of the row upwards by one row, and thereafter shift the position of the column to the left by one column.

Each of the analog processing elements may include one write number counter, and the write number counter is configured such that the number of write operations on the memory cell located in the first row and the first column is recorded.

The endurance manager may be configured such that an input voltage is not applied to a word line (WL) corresponding to a row of a memory cell to which matrix data is not written, among internal memory cells of each of the analog processing elements, and such that an output of a bit line (BL) corresponding to a column of the memory cell to which matrix data is not written is discarded.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
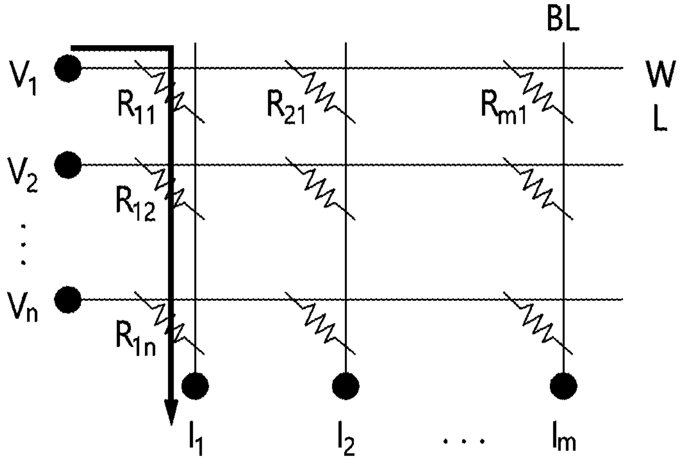
FIG. 1 is a diagram for explaining the operating principle of analog compute-in-memory.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Hereinafter, embodiments of the present disclosure will be described in detail with reference to the accompanying drawings. In the following description of the present disclosure, the same reference numerals are used to designate the same or similar elements throughout the drawings and repeated descriptions of the same components will be omitted.

FIG. 1 is a diagram for explaining the operating principle of analog compute-in-memory.

Referring to FIG. 1, each memory cell (element) may store specific information depending on the resistance state of a material in which data is stored.

In FIG. 1, when a specific voltage is applied to a word line (WL) corresponding to a row, a current proportional to the applied voltage and the conductance value of the corresponding memory cell flows through each of the memory cells.

Here, in FIG. 1, the value of the current flowing through a bit line (BL) corresponding to a column may be the sum of currents flowing through all memory cells included in the corresponding column.

For example, in FIG. 1, a current $I_1$ flowing through a first BL may be a value corresponding to $$\sum_{i=1}^{n}(V_i \times C_{1i}), \text{ where } C_{1i} = 1/R_{1i}.$$

The above-described principle may be replaced with a Matrix Vector Multiplication (MVM) operation that is most widely used in Artificial Intelligence (AI) operations.

Such an MVM operation is frequently used in an Artificial Neural Network (ANN), and corresponds to an operation of calculating a result value (i.e., output value) by multiplying a vector corresponding to input (i.e., input vector) by a weight matrix.

When the MVM operation is performed using the analog compute-in-memory, a weight matrix is stored in the form of a conductance value in each of the memory cells, and an input vector value is applied to the word line (WL) in the form of a voltage. Thereafter, when the value of a current flowing through each bit line (BL) is detected, an output vector may be obtained.

This analog-based operation scheme not only has a much higher operation speed than a digital-based operation scheme, but also has very high power efficiency. Due thereto, analog computing technology based on analog compute-in-memory has attracted attention as technology for artificial intelligence operation, and may be utilized in various fields including the MVM operation.

When an analog computing system for artificial intelligence is configured by utilizing such analog compute-in-memory, a high-performance system having high energy efficiency may be configured.

Figure 2:
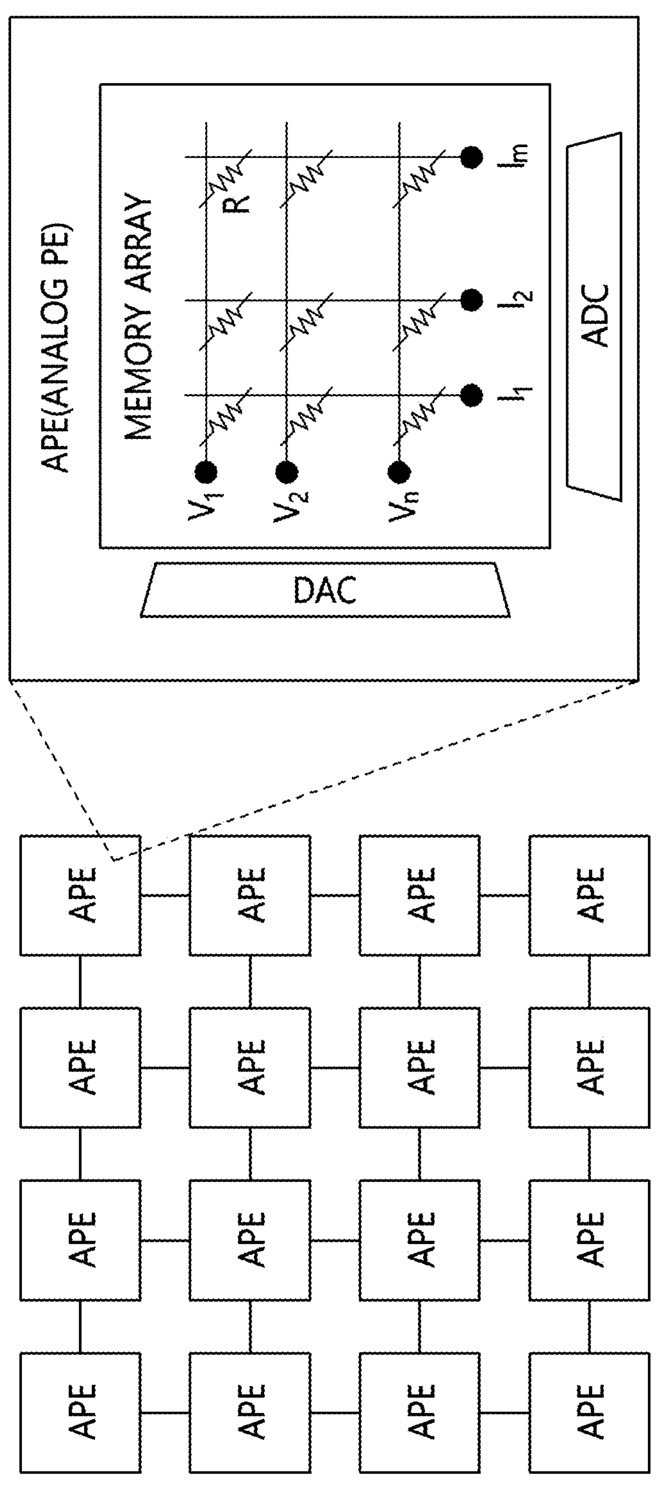
FIG. 2 is a diagram illustrating an example of the structure of hardware architecture based on analog compute-in-memory.

FIG. 2 is a diagram illustrating an example of the hardware architecture based on analog compute-in-memory.

Referring to FIG. 2, the hardware based on analog compute-in-memory may be implemented in a structure in which multiple Analog Processing Elements (APEs) are connected in the form of a Network on Chip (NoC) to have scalability.

Here, the multiple Analog Processing Elements (APEs) may simultaneously perform operations in parallel. Further, by means of NoC, data communication may be performed between the multiple Analog Processing Elements (APEs).

Also, each of the multiple APEs may be configured such that an Analog-to-Digital Converter (ADC) and a Digital-to-Analog Converter (DAC) for converting the input/output values of the memory cells between analog and digital domain are added to an area around a memory array including n×m memory cells, which corresponds to the analog compute-in-memory of FIG. 1.

In order for the above-described hardware based on analog compute-in-memory to perform an MVM operation, matrices to be used to perform operations need to be stored in memory cells constituting each of analog processing elements (where the memory array of FIG. 2 corresponds to n×m memory cells).

This represents that a program or write operation is performed, and refers to a process for storing a resistance value, corresponding to the value of each of elements constituting the matrix, in each memory cell.

In this process, when the position of an analog processing element to which a matrix value is to be programmed and the positions of memory cells included in the analog processing element need to be determined.

However, due to the characteristics of the analog compute-in-memory, there are constraints. In the analog compute-in-memory, the same voltage may be applied to the same word line (WL), and the values of currents flowing through the same bit line (BL) may be summed. Therefore, in memory cells present in one analog processing element, different matrices cannot be arranged together. When different matrices are arranged in the same memory, incorrect results may be derived due to mixing of input or output values. That is, when multiple matrices are stored in the memory of one analog processing element, there is a high likelihood of causing operational errors.

Furthermore, the issue desired to be solved in the present disclosure is due to the fact that memory cells of analog compute-in-memory have a limited number of write operations. In other words, when a number of write operations above the specified number of write operations are performed on the same memory cell, the corresponding cell can no longer be used.

That is, when errors occur in some memory cells, memory management may be difficult, thus leading to frequent operational errors. For reference, the limited number of write operations may vary depending on the characteristics of memory devices, such as flash memory, ReRAM, MRAM, and PCM, but there are constraints on the number of write operations in all memory devices.

However, there frequently occurs a situation in which a write operation is inevitably performed. In addition to the case where the matrix is initially stored in the memory, various cases may occur, for example, the following cases may be present.

First, a value written in the form of a resistance value in an memory cell of analog compute-in-memory may be changed with the lapse of time. This is called drift phenomenon, by which a value initially stored in the memory cell is changed over time, thus leading to operational errors.

Second, there is the case where errors occur in some memory cells. Due to the characteristics of memory elements, some cells may malfunction. Also, as described above, there may occur the case where the number of write operations performed on a specific memory cell excessively increases, thus causing errors in the corresponding memory cell. In this case, in order to normally perform operations, management should be performed such that a memory area in which errors have occurred is excluded from operations and values stored in the memory area are shifted to another place to perform operations on the place.

Third, when memory is utilized for a training operation for artificial intelligence, a weight matrix value for an artificial intelligence model needs to be frequently updated. In this case, a write operation is performed several times on the same memory cell.

As described above, there are some methods for solving the above-described problems.

For example, in order to maximally reduce operational errors even if a drift occurs when artificial intelligence operations are performed, a training method for modifying a weight matrix value itself may be present. However, this method not only increases a computational overhead, but also consequently requires an update of a weight matrix value.

In addition, update is performed using a scheme for periodically updating the resistance value of a memory cell in which a weight value is stored. When this process is repeatedly performed, the number of write operations on the same memory cell increases, thus leading to a phenomenon in which the number of write operations on some memory cells increases. Consequently, because errors in memory cells occur, and the analog computing system cannot be successively utilized, managing the endurance of memory cells is essential from this aspect.

Therefore, the described embodiment proposes a method for managing memory cell endurance of an analog computing system to solve the above-described problems.

Figures 3, 4:
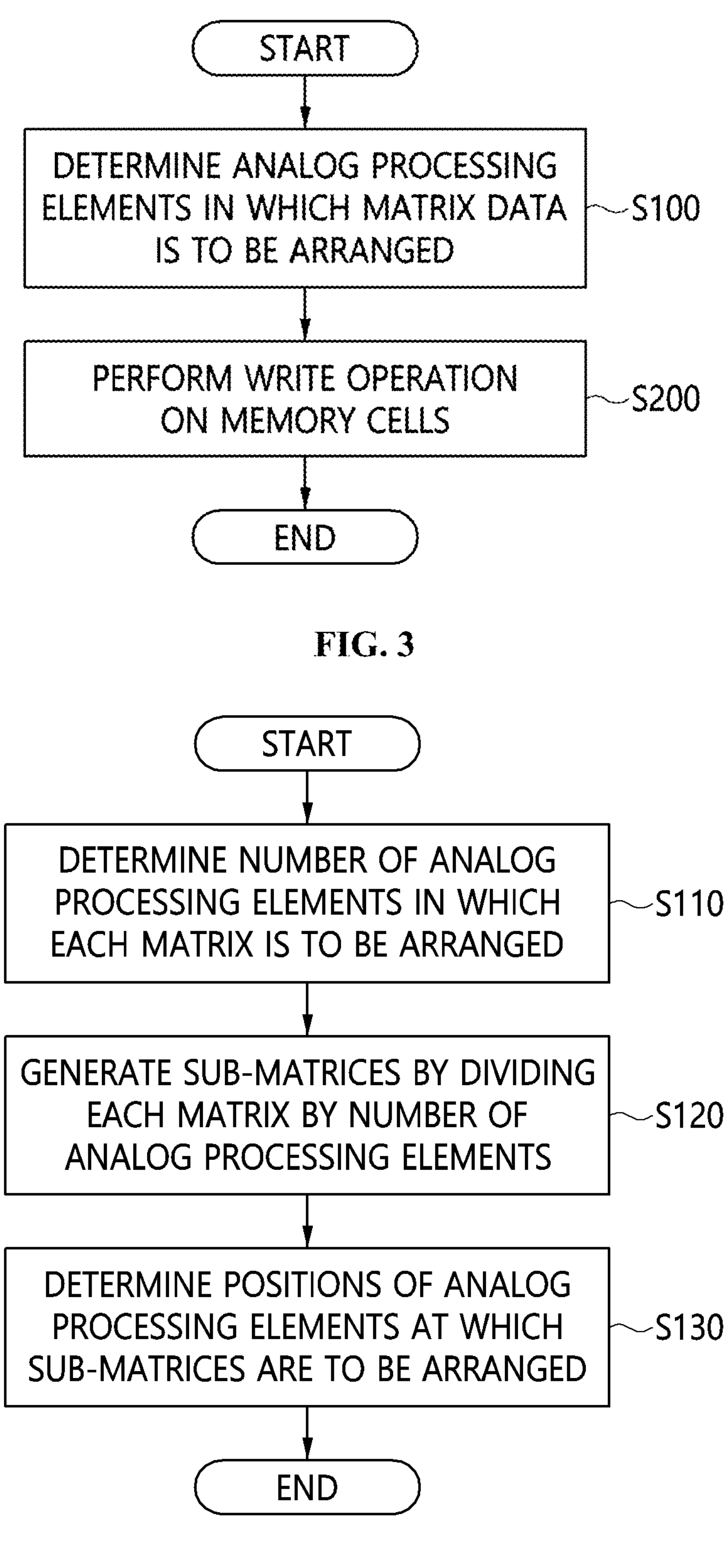
FIG. 3 is a flowchart for explaining a method for managing memory cell endurance of an analog computing system according to an embodiment.
FIG. 4 is a flowchart for explaining a method for determining analog processing elements in which matrix data is to be arranged according to an embodiment.

FIG. 3 is a flowchart for explaining a method for managing memory cell endurance of an analog computing system according to an embodiment.

Referring to FIG. 3, the method for managing memory cell endurance of the analog computing system according to the embodiment may broadly include step S100 of determining analog processing elements in which matrix data is to be arranged and step S200 of performing a write operation on memory cells in consideration of endurance.

Step S100 of determining the analog processing elements in which matrix data is to be arranged according to an embodiment may be performed to determine positions at which matrix data to be used for calculation is to be stored in order to perform MVM operations. That is, Analog Processing Elements (APEs) in which respective pieces of matrix data are to be arranged are determined. Detailed description of step S100 of determining the analog processing elements in which pieces of matrix data are to be arranged will be made later with reference to FIGS. 4 to 6.

Next, at step S200 of performing the write operation on the memory cells in consideration of endurance, matrix values are stored in memory of the analog processing elements arranged at step S100, and then operations are performed.

However, there may occur a situation in which the corresponding matrix value is to be updated due to the characteristics of the analog compute-in-memory while performing operations.

Here, the cases where matrix data is to be updated may include the case where previously stored values are changed due to drift characteristics, the case where memory cell errors occur, and the case where matrix values are changed due to AI training.

Here, in an embodiment, instead of overwriting a new value to the memory cell in which current matrix data is stored, an update operation is performed while continuously shifting to the position of the memory cell in which the matrix data is to be stored in the memory of the analog processing element.

That is, when the position at which matrix data is stored is shifted whenever update occurs, the result of uniformly distributing the numbers of write operations on all memory cells may be obtained, thus enabling the management of memory endurance. Detailed description of step S200 of performing the write operation on the memory cells in consideration of endurance will be made later with reference to FIGS. 7 to 9.

Further, when step S200 of performing the write operation on the memory cells in consideration of endurance according to the embodiment is performed, a memory cell write number counter may be managed.

Here, steps S100 and S200 may be sequentially performed, or may be independently performed.

Further, as the above-described steps S100 and S200 are sequentially applied, the average numbers of write operations on respective memory cells of the multiple analog processing elements constituting the system may be managed to be equal. By means of this operation, the probability of errors occurring due to the limited number of write operations in the memory of a specific analog processing element may be decreased, with the result that the endurance of the entire analog computing system may be improved.

Figure 5:
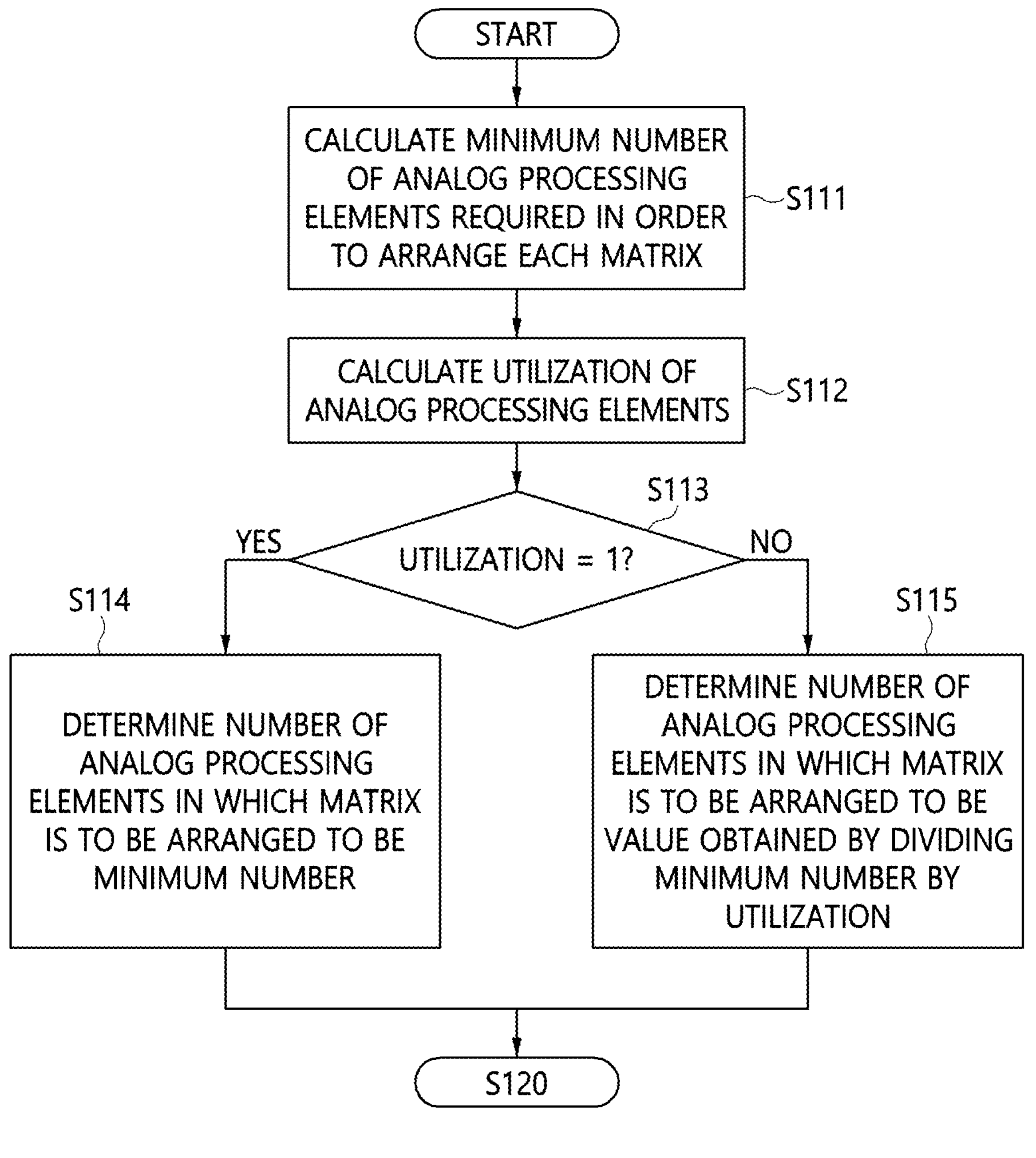
FIG. 5 is a flowchart for explaining the step of determining the number of analog processing elements according to an embodiment.
Figure 6:
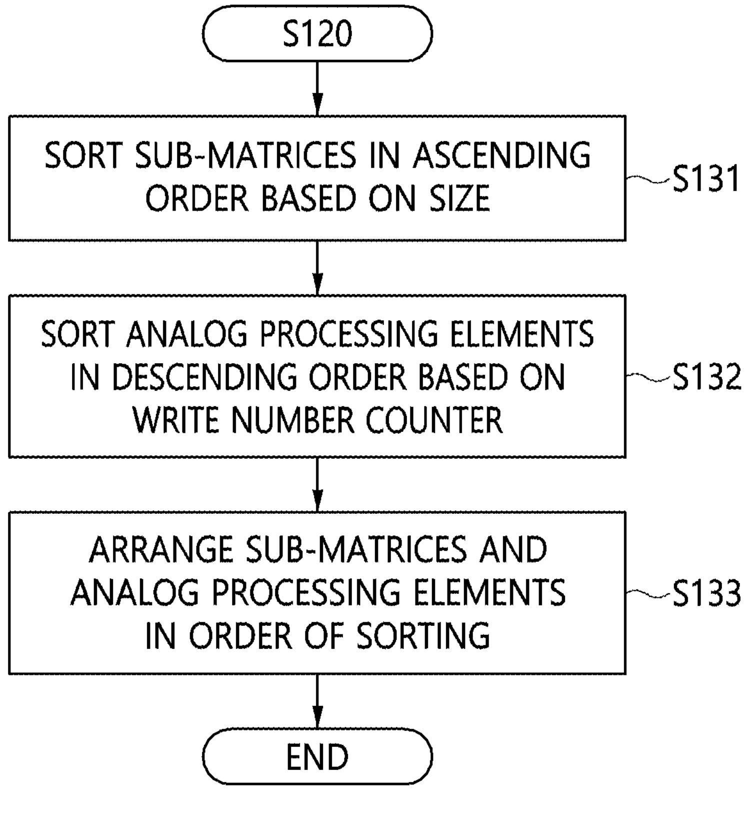
FIG. 6 is a flowchart for explaining the step of determining the positions of analog processing elements according to an embodiment.

FIG. 4 is a flowchart for explaining a method for determining analog processing elements in which matrix data is to be arranged according to an embodiment, FIG. 5 is a flowchart for explaining the step of determining the number of analog processing elements according to an embodiment, and FIG. 6 is a flowchart for explaining the step of determining the positions of analog processing elements according to an embodiment.

Referring to FIG. 4, the method for determining analog processing elements in which matrix data is to be arranged according to the embodiment may include step S110 of determining the number of analog processing elements (APEs) in which each of one or more matrices is to be arranged (see FIG. 5), step S120 of generating sub-matrices by dividing each of the one or more matrices by the determined number of analog processing elements, and step S130 of determining respective positions of the analog processing elements at which individual sub-matrices resulting from division are to be arranged (see FIG. 6).

Here, at step S110 of determining the number of analog processing elements, each matrix may be performed so that the matrix is arranged to be maximally distributed by utilizing all of available analog processing elements.

For this, step S110 of determining the number of analog processing elements may be performed based on input values including n matrices $M=\{M_1, M_2, \ldots, M_n\}$ to be stored in the analog processing elements, the size $A_i \times B_i$ of each matrix $M_i$, the number of memory cells X×Y in a single analog processing element, and the number $P_{total}$ of available analog processing elements in which the matrices are to be arranged.

Here, according to an embodiment, the numbers of memory cells in all analog processing elements may be identical to each other, that is, X×Y.

Referring to FIG. 5, step S110 of determining the number of analog processing elements according to the embodiment may include step S111 of calculating the minimum number $K_i$ of analog processing elements required in order to arrange each of the one or more matrices $M_i$.

Here, at step S111 of calculating the minimum number of analog processing elements, the size $A_i \times B_i$ of each of the one or more matrices $M_i$ may be divided by the number of memory cells X×Y in the single analog processing element, as shown in the following Equation (1):

$$K_i = \lceil A_i/X \rceil \times \lceil B_i/Y \rceil \quad (1)$$

Thereafter, step S110 of determining the number of analog processing elements according to the embodiment may include step S112 of calculating the utilization of the total number of analog processing elements based on the calculated minimum numbers.

Here, the utilization of the analog processing elements may be calculated using the following Equation (2):

$$\text{utilization} = \left(\sum_{i=1}^{n} K_i\right) / P_{total} \quad (2)$$

Here, step S110 of determining the number of analog processing elements according to the embodiment may include steps S113 to S115 of calculating the number of analog processing elements $P_i$ ($P=\{P_1, P_2, \ldots, P_n\}$) to be used to arrange each of the one or more matrices $M_i$ based on the calculated utilization.

Here, when utilization is 1 at step S113, the number of analog processing elements $P_i$ to be used to arrange each of the one or more matrices $M_i$ may be determined to be the corresponding minimum number $K_i$ ($P_i=K_i$) at step S114.

On the other hand, when the utilization is not 1 at step S113, the number of analog processing elements $P_i$ to be used to arrange each of the one or more matrices $M_i$ may be determined to be a value obtained by dividing the corresponding minimum number $K_i$ by the utilization at step S115.

$$P_i = \left\lfloor \frac{K_i}{\text{utilization}} \right\rfloor \times \left\lceil \frac{K_i}{\text{utilization}} \right\rceil, \text{ where } \sum_{i=1}^{n} P_i = P_{total} \quad (3)$$

Then, at step S120 illustrated in FIG. 4, sub-matrices $M'=\{M'_1, M'_2, \ldots, M'_{P_{total}}\}$ may be generated by dividing each matrix $M_i$($M=\{M_1, M_2, \ldots, M_n\}$) by the number of analog processing elements $P_i$ ($P=\{P_1, P_2, \ldots, P_n\}$) calculated at step S110 in which the corresponding matrix is to be arranged.

Next, at step S130 of determining respective positions of the analog processing elements according to the embodiment, a larger matrix is arranged in an analog processing element having long lifespan in consideration of the fact that, as the size of the matrix is larger, the number of write requests becomes greater.

Here, the lifespan of the memory of each analog processing element is in inverse proportion to the number of write operations performed to the current time.

For this, step S130 of determining respective positions of the analog processing elements may be performed based on input values including the sub-matrices $M'=\{M'_1, M'_2, \ldots, M'_{P_{total}}\}$ resulting from division, the size $A'_i \times B'_i$ of each sub-matrix, $M'_i$ and a (PE ID, write number counter) list $C=\{(1, C_1), (2, C_2), \ldots, (P_{total}, C_{P_{total}})\}$ of the corresponding analog processing element.

Referring to FIG. 6, at step S130 of determining respective positions of the analog processing elements according to the embodiment, step S131 of sorting the corresponding sub-matrix $M'_i$ in ascending order based on the size $A'_i \times B'_i$ of the sub-matrix $M'_i$ may be performed.

Next, at step S130 of determining respective positions of the analog processing elements according to the embodiment, step S132 of sorting the analog processing elements in descending order based on the write number counter values may be performed.

That is, the (PE ID, write number counter) lists C of the analog processing elements are sorted in descending order based on the write number counter $C_i$.

Thereafter, at step S130 of determining respective positions of the analog processing elements according to the embodiment, step S133 of arranging the sub-matrices and the analog processing elements to be mapped to each other in the order of sorting may be performed.

That is, when analog processing element ID lists ($PE=\{PE_1, PE_2, \ldots, PE_{P_{total}}\}$) corresponding to the sorted $M'_i$($M'=\{M'_1, M'_2, \ldots, M'_{P_{total}}\}$) and the sorted $C_i$ are sequentially arranged, arrangement suitable for purpose may be implemented.

Figure 7:
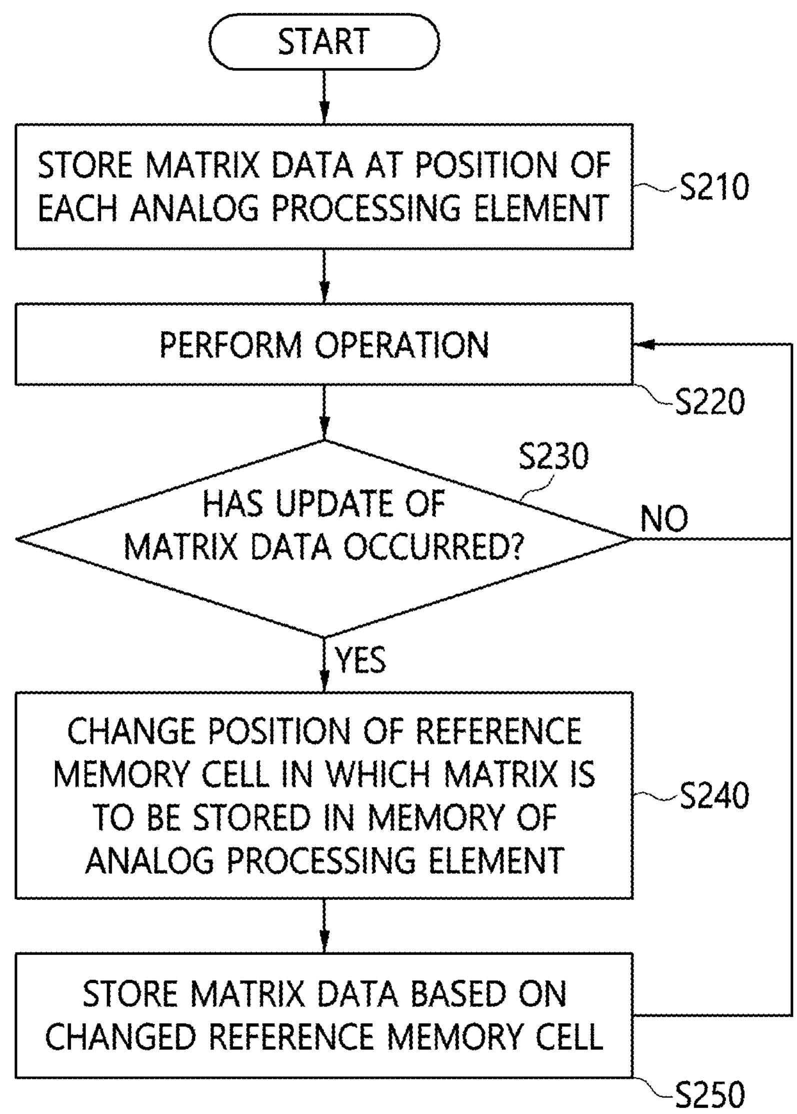
FIG. 7 is a flowchart for explaining a method for performing a write operation on memory cells in which endurance is considered according to an embodiment.
Figure 8:
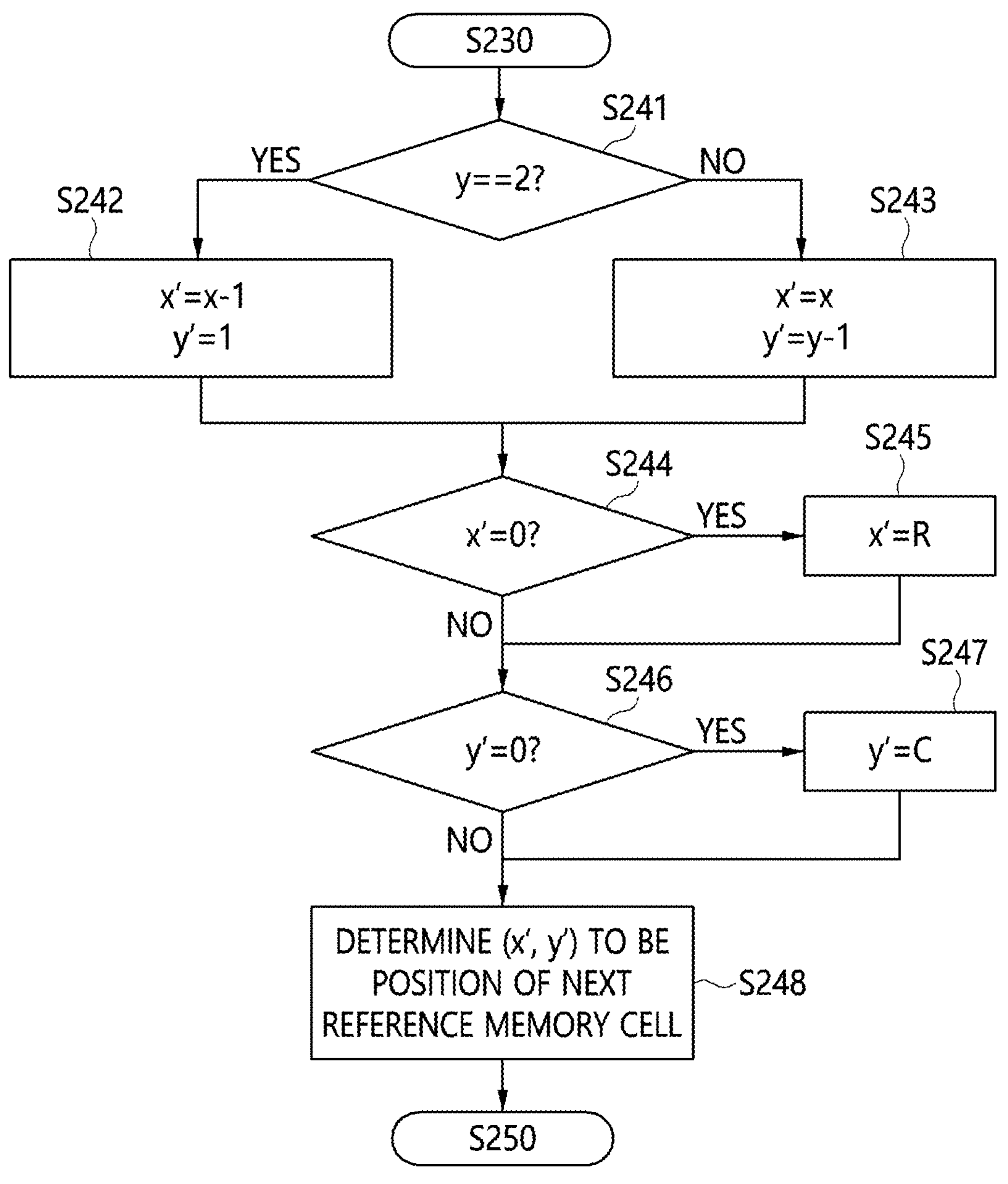
FIG. 8 is a flowchart for explaining the step of determining the position of a reference memory cell according to an embodiment.
Figure 9:
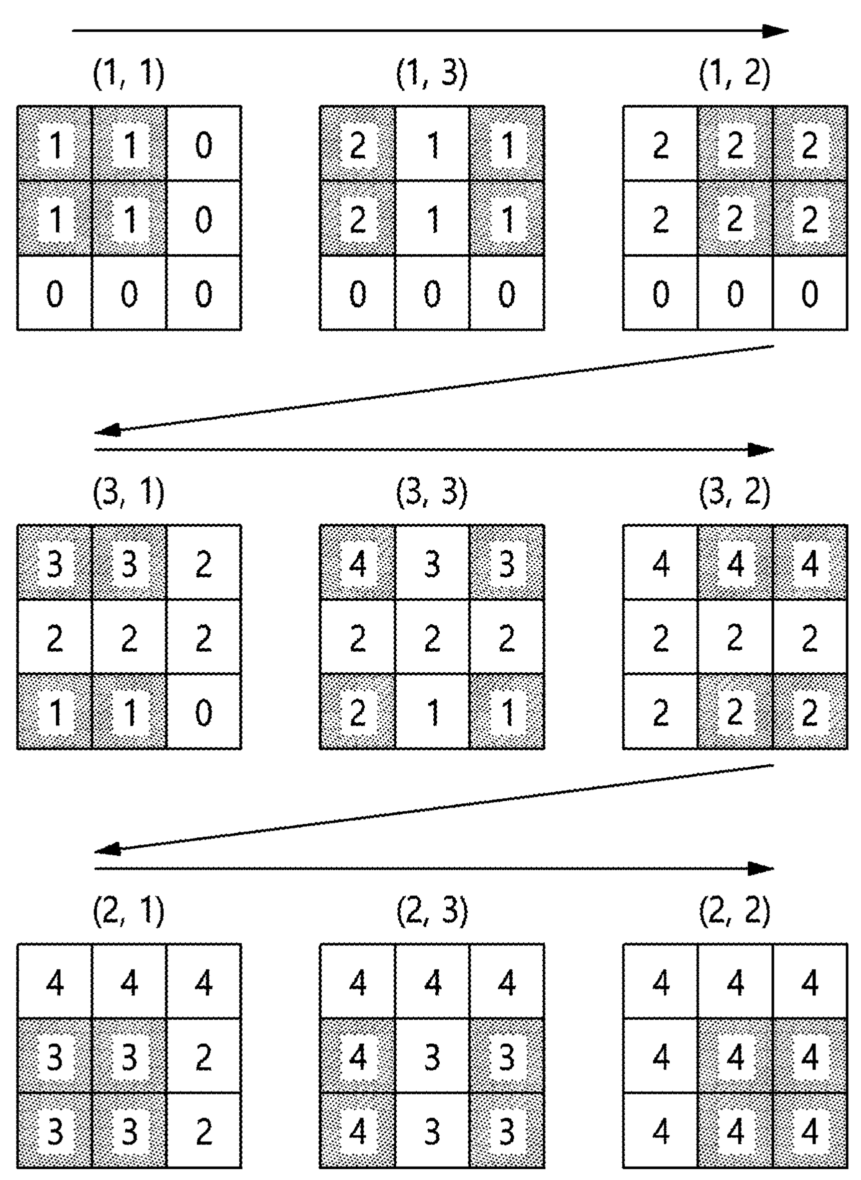
FIG. 9 is a diagram illustrating an example for performing a write operation on memory cells in which endurance is considered according to an embodiment.

FIG. 7 is a flowchart for explaining a method for performing a write operation on memory cells in which endurance is considered according to an embodiment, FIG. 8 is a flowchart for explaining the step of determining the position of a reference memory cell according to an embodiment, and FIG. 9 is a diagram illustrating an example for performing a write operation on memory cells in which endurance is considered according to an embodiment.

Referring to FIG. 7, the method for performing a write operation on memory cells according to the embodiment may include, as update of matrix data stored in each analog processing element occurs at step S230, step S240 of determining the position of the next reference memory cell among internal memory cells of the analog processing element, and step S250 of storing updated matrix data in memory cells selected based on the position of the determined next reference memory cell.

However, before the update of the matrix data occurs at step S230, matrix data may be initially stored in each analog processing element determined by the method for determining the analog processing elements in which the matrix data is to be arranged at step S210.

Here, the position of the reference memory cell in which the initial matrix value is stored may be a position corresponding to a first row and a first column.

For example, referring to FIG. 9, an element corresponding to the first row and first column of the matrix may be arranged to be aligned with a memory cell in the first row and first column of the analog processing element. Here, the reference memory cell is denoted by (1, 1).

Thereafter, an operation may be performed in the state in which the matrix data is stored based on the reference memory cell of the analog processing element at step S220.

An update of the matrix data stored in the analog processing element may occur at step S230 while the operation is being performed at step S220.

Here, as described above, the cases where the matrix data is to be updated may include the case where previously stored values are changed due to drift characteristics, the case where memory cell errors occur, and the case where matrix values are changed due to AI training.

Here, in an embodiment, instead of overwriting a new value to the memory cell in which current matrix data is stored, the matrix data is updated while continuously shifting to the position of the memory cell in which the matrix data is to be stored in the memory of the analog processing element.

That is, when the position at which matrix data is stored is shifted whenever the update occurs, the result of uniformly distributing the numbers of write operations on all memory cells may be obtained, thus enabling the management of memory endurance.

For this, step S240 of determining the position of the next reference memory cell according to the embodiment may be performed to satisfy a condition in which the number of write operations on the memory cell corresponding to the first row and the first column of the analog processing element becomes the maximum value among the numbers of write operations on all memory cells.

When the memory cells in the analog processing element are configured using C columns and R rows, the reference memory cell is first shifted from a C-th column to the left by one column.

For example, as shown in FIG. 9, the position of the reference memory cell is changed in the order of (1, 1)→(1, C)→(1, C−1)→(1, C−2)→(1, C−3)→ . . . →(1, 2).

By means of this change, when the column position is 2 and the positions of the current column are entirely used, the position of the reference memory cell is shifted upwards from an R-th row by one row. Thereafter, a process for shifting the reference memory cell by 1 column again is repeated.

For example, as shown in FIG. 9, the position of the reference memory cell becomes (R, 1)→(R, C)→(R, C−1)→(R, C−2)→(R, C−3)→ . . . →(R, 2).

By repeating the above-described operation, all rows and columns of memory cells included in the analog processing element are caused to be determined to be the position of the reference memory cell at least once, and thus the numbers of write operations on all memory cells may be equally maintained if the write operations are repeated.

In detail, referring to FIG. 8, a calculation process of changing the position (x, y) of the current reference memory cell at which the current matrix is stored to the position (x', y') of the next reference memory cell at which an updated matrix value is to be stored is illustrated in detail.

First, when y is not 2 at the position (x, y) of the current reference memory cell at step S241, x' at the position (x', y') of the next reference memory cell may be set to the value of the position x of the current reference memory cell, and y' may be set to a value obtained by subtracting 1 from the position y of the current reference memory cell, that is, (y−1) at step S245.

On the other hand, when y at the position (x, y) of the current reference memory cell is 2 at step S241, x' at the position (x', y') of the next reference memory cell may be set to a value obtained by subtracting 1 from the position x of the current reference memory cell, that is, (x−1) and y' is set to 1 at step S242.

However, at least one of x' and y' at the position (x', y') of the next reference memory cell may be 0 at steps S244 and S246.

In this case, x' at the position (x', y') of the next reference memory cell may be determined to be the number of rows R corresponding to the memory cells included in the analog processing element at step S245, and y' at the position (x', y') may be determined to be the number of columns C corresponding to memory cells included in the analog processing element at step S247.

As the above-described steps S220 to S250 are repeatedly performed, matrix data may be repeatedly updated and stored while the position of the reference memory cell is changed, as shown in FIG. 9.

In FIG. 9, when a request to update a matrix having a 2×2 size continuously occurs in memory cells in an analog processing element of a 3×3 size, an arrow means the order of change of a write position.

Further, a value indicated by (x, y) above each of the memory cells in the analog processing element refers to the position of the reference memory cell on which writing is to be performed, matrix values are stored in shaded memory cells, and a number indicated in each of the memory cells denotes the number of write operations on the corresponding memory cell.

Referring to FIG. 9, according to the above-described embodiment, at a time point at which one cycle in which a write operation is performed while the row and column of each memory cell are changed is completed, that is, a time point at which the position of the reference memory cell is (2, 2), the numbers of write operations (write counts) on respective memory cells are equally distributed to be '4'.

Here, when the position to which a matrix is written is changed, an operation needs to be performed in consideration of the position of the newly written matrix.

In an embodiment, this may be solved by setting the input of a word line (WL) corresponding to the row of the memory cell to which a matrix is not written to 0 and preventing the output of a bit line (BL) corresponding to the column of the memory cell to which the matrix is not written from being used.

Meanwhile, in order to manage the endurance of memory cells of analog compute-in-memory, the number of write operations performed on each memory cell needs to be tracked.

For this, a method for recording the number of write operations (i.e., write count) on each memory cell may be the simplest method, but a count for each of the memory cells needs to be managed, thus increasing temporal and spatial overhead.

Therefore, in an embodiment, the number of write operations (i.e., write count) is managed in units of analog processing elements other than in units of memory cells.

That is, each of the analog processing elements according to an embodiment may include one write number counter. Then, there is no need to provide a counter in each memory cell, and the write count may be tracked using only one counter for each analog processing element.

Also, the write number counter may be determined by the number of write operations on the memory cell located in a first row and a first column.

Referring to FIG. 9, the number of write operations on the memory cell in the first row and the first column of the memory of the analog processing element may always be the maximum value among the numbers of write operations on all memory cells constituting the analog processing element. Therefore, in an embodiment, one write number counter is maintained in the analog processing element, and the number of write operations (write count) on the memory cell located in the first row and the first column is set to the representative value of the write counts of the analog processing element.

In this way, the reason for managing endurance based on the maximum value of the number of write operations is that such management becomes a sufficient criterion for preventing errors attributable to the limited number of write operations on memory cells.

Figure 10:
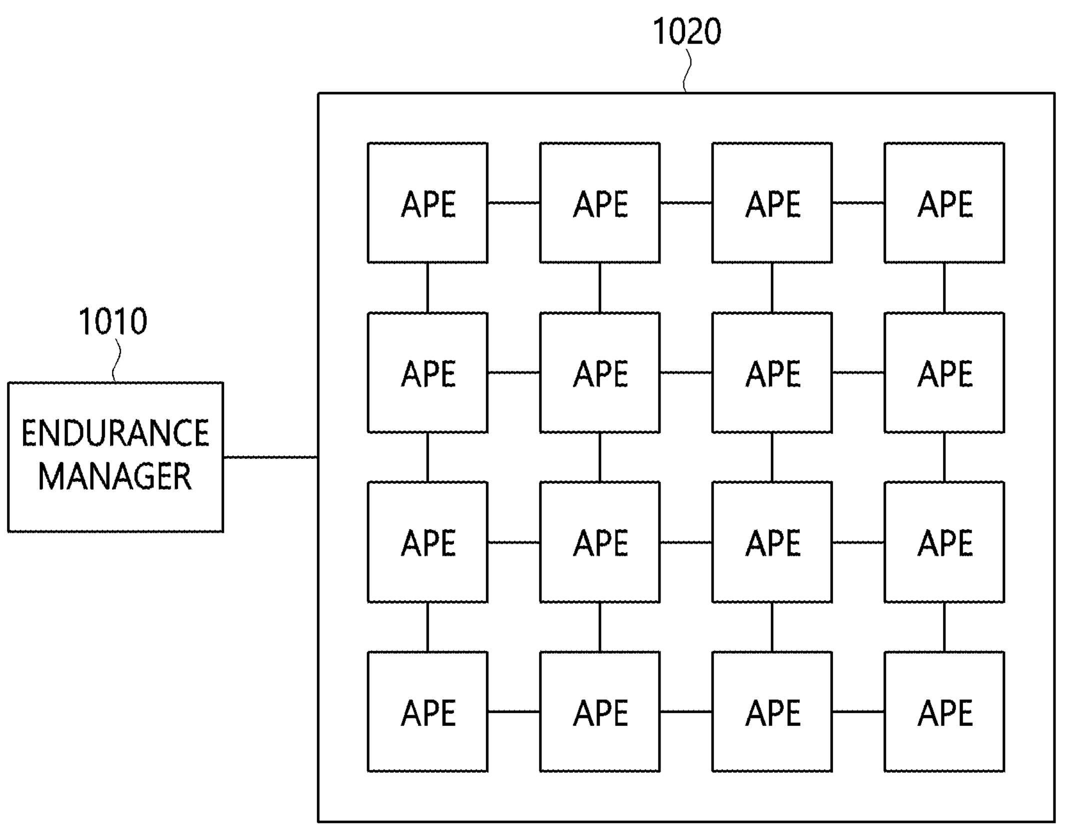
FIG. 10 is a diagram illustrating the configuration of an apparatus for managing memory cell endurance of an analog computing system according to an embodiment.

FIG. 10 is a diagram illustrating the configuration of an apparatus for managing memory cell endurance of an analog computing system according to an embodiment.

The apparatus for managing memory cell endurance of the analog computing system according to the embodiment may include hardware based on analog compute-in-memory 1020 and an endurance manager 1010.

The hardware based on analog compute-in-memory 1020 may include multiple analog operation processors (i.e., Analog Processing Elements: APEs).

Here, the multiple Analog Processing Elements (APEs) are connected in the form of a Network on Chip (NoC) to implement a scalable structure.

Each of the APEs may be provided with a vector and a matrix as operands to perform a Vector-Matrix Multiplication (VMM) operation. That is, each of the APEs may include multiple sub-arrays. Each sub-array may include multiple memory cells connected between multiple row lines and multiple column lines. For neural network operations, as a weight matrix that is a first operand may be stored in the memory cell of a sub-array, and a vector corresponding to an input feature map that is a second operand is applied to the row line of the sub-array, operations in the memory, for example, VMM operations, may be performed.

The endurance manager 1010 may be implemented using any of various types of controllers, microprocessors or general-purpose processors which execute programs or processing instructions.

According to an embodiment, the endurance manager 1010 may perform at least one of the method for managing memory cell endurance of the analog computing system, the method for determining analog processing elements in which matrix data is to be arranged or the method for performing a write operation on memory cells in consideration of endurance, described above with reference to FIGS. 3 to 9, or a combination thereof.

Although the embodiment of the present disclosure has been disclosed, those skilled in the art will appreciate that the present disclosure can be implemented as other concrete forms, without departing from the scope and spirit of the disclosure as disclosed in the accompanying claims. Therefore, it should be understood that the foregoing embodiments are only for illustrative purpose and are not intended to limit the scope of the present disclosure.

Specific executions described in the present disclosure are embodiments, and the scope of the present disclosure is not limited to specific methods. For simplicity of the specification, descriptions of conventional electronic components, control systems, software, and other functional aspects of the systems may be omitted. As examples of connections of lines or connecting elements between the components illustrated in the drawings, functional connections and/or circuit connections are exemplified, and in actual devices, those connections may be replaced with other connections, or may be represented by additional functional connections, physical connections or circuit connections. Furthermore, unless definitely defined using the term "essential", "significantly" or the like, the corresponding component may not be an essential component required in order to apply the present disclosure.

According to the described embodiments, it may be possible to reduce errors in an analog computing system and extend memory usage lifespan by managing the endurance of memory cells of analog compute-in-memory.

According to the described embodiments, it may be possible to solve the problem of analog compute-in-memory endurance attributable to overhead corresponding to the number of write operations when a request for an update of values stored in memory cells of analog compute-in-memory and for a write operation occurs.

Therefore, the spirit of the present disclosure should not be limitedly defined by the above-described embodiments, and it is appreciated that all scopes of the accompanying claims and equivalents thereof belong to the scope of the spirit of the present disclosure.

What is claimed is:

1. A method for arranging a matrix in an analog processing element, comprising:

determining a number of analog processing elements in which each of one or more matrices is to be arranged;

generating sub-matrices by dividing each of the one or more matrices by the determined number of analog processing elements; and determining respective positions of the analog processing elements at which the sub-matrices resulting from division are to be arranged.

2. The method of claim 1, wherein determining the number of analog processing elements comprises:

calculating a minimum number of analog processing elements required for arranging each of the one or more matrices;

calculating utilization of a total number of analog processing elements based on calculated minimum numbers; and calculating a number of analog processing elements to be used to arrange each of the one or more matrices.

3. The method of claim 2, wherein calculating the minimum number comprises:

dividing a size of each of the one or more matrices by the number of memory cells of each analog processing element.

4. The method of claim 2, wherein calculating the number of analog processing elements comprises:

when the utilization is 1, determining the number of analog processing elements to be used to arrange each of the one or more matrices to be the corresponding minimum number.

5. The method of claim 2, wherein calculating the number of analog processing elements comprises:

when utilization is not 1, determining the number of analog processing elements to be used to arrange each of the one or more matrices to be a value obtained by dividing the corresponding minimum number by the utilization.

6. The method of claim 1, wherein determining respective positions comprises:

sorting the sub-matrices in ascending order based on a size;

sorting the analog processing elements in descending order of a write number counter value; and arranging the sub-matrices and the analog processing elements to be mapped to each other in order of sorting.

7. A method for performing a write operation on memory cells in consideration of endurance, comprising:

as an update of matrix data stored in an analog processing element occurs, determining a position of a next reference memory cell among internal memory cells of the analog processing element; and writing updated matrix data to memory cells selected based on the determined position of the next reference memory cell.

8. The method of claim 7, wherein determining the position of the next reference memory cell comprises:

satisfying a condition in which a number of write operations on a memory cell corresponding to a first row and a first column of the analog processing element becomes a maximum value among numbers of write operations on all memory cells.

9. The method of claim 8, wherein:

the analog processing element comprises one write number counter, and the write number counter is configured such that the number of write operations on the memory cell located in the first row and the first column is recorded.

10. The method of claim 8, wherein the analog processing element is configured such that an input voltage of a word line (WL) corresponding to a row of memory cells to which matrix data is not written, among internal memory cells of the analog processing element, is set to 0 and such that an output of a bit line (BL) corresponding to a column of the memory cell to which matrix data is not written is discarded.

11. The method of claim 7, wherein determining the position of the next reference memory cell comprises:

fixing a position of a row of the next reference memory cell and shifting a position of a column of the next reference memory cell to left by one column, when the position of the column is a second column, shifting the position of the row upwards by one row, and thereafter performing again shifting the position of the column to the left by one column.

12. An apparatus for managing memory cell endurance of an analog computing system, comprising:

hardware based on analog compute-in-memory including multiple analog processing elements; and an endurance manager configured to manage the hardware based on analog compute-in-memory, wherein the endurance manager is configured to:

determine analog processing elements in which matrix data is to be arranged and write matrix data to the determined analog processing elements, and wherein as an update for matrix data stored in the analog processing elements occurs, write updated matrix data to memory cells selected based on a number of write operations on internal memory cells of each of the analog processing elements.

13. The apparatus of claim 12, wherein the endurance manager is configured to, when the analog processing elements in which the matrix data is to be arranged are determined, determine a number of analog processing elements in which each of one or more matrices is to be arranged, generate sub-matrices by dividing each of the one or more matrices by the determined number of analog processing elements, and determine respective positions of the analog processing elements at which the sub-matrices resulting from division are to be arranged.

14. The apparatus of claim 13, wherein the endurance manager is configured to, when the analog processing elements in which the matrix data is to be arranged, calculate a minimum number of analog processing elements required for arranging each of the one or more matrices, calculate utilization of a total number of analog processing elements based on calculated minimum numbers, and calculate a number of analog processing elements to be used to arrange each of the one or more matrices.

15. The apparatus of claim 13, wherein the endurance manager is configured to, when respective positions of the analog processing elements at which the sub-matrices resulting from division are to be arranged are determined, sort the sub-matrices in ascending order based on a size, sort the analog processing elements in descending order of a write number counter value, and arrange the sub-matrices and the analog processing elements to be mapped to each other in order of sorting.

16. The apparatus of claim 12, wherein the endurance manager is configured to, when the updated matrix data is written, determine a position of a next reference memory cell among internal memory cells of each of the analog processing elements, and write updated matrix data to memory cells selected based on the determined position of the next reference memory cell.

17. The apparatus of claim 16, wherein the endurance manager is configured to, when the position of the next reference memory cell is determined, satisfy a condition in which a number of write operations on a memory cell corresponding to a first row and a first column of each of the analog processing elements becomes a maximum value among numbers of write operations on all memory cells.

18. The apparatus of claim 16, wherein the endurance manager is configured to:

when the position of the next reference memory cell is determined, fix a position of a row of the next reference memory cell and shift a position of a column of the next reference memory cell to left by one column, and when the position of the column is a second column, shift the position of the row upwards by one row, and thereafter shift the position of the column to the left by one column.

19. The apparatus of claim 16, wherein:

each of the analog processing elements comprises one write number counter, and the write number counter is configured such that the number of write operations on the memory cell located in the first row and the first column is recorded.

20. The apparatus of claim 16, wherein the endurance manager is configured such that an input voltage is not applied to a word line (WL) corresponding to a row of memory cells to which matrix data is not written, among internal memory cells of each of the analog processing elements, and such that an output of a bit line (BL) corresponding to a column of the memory cell to which matrix data is not written is discarded.

* * * * *